United States Patent [19]

Angelillo et al.

[11] Patent Number: 4,819,992
[45] Date of Patent: Apr. 11, 1989

[54] DUPLEX-TYPE DISTRIBUTOR FOR A PNEUMATIC BRAKING SYSTEM FOR A MOTOR VEHICLE EQUIPPED WITH AN AUXILIARY SLOWING DEVICE

[75] Inventors: Domenico Angelillo, Sesto S. Giovanni; Antonio Riversa, Cologno Monzese, both of Italy

[73] Assignee: Industrie Magneti Marelli S.r.l., Milan, Italy

[21] Appl. No.: 113,097

[22] Filed: Oct. 27, 1987

[30] Foreign Application Priority Data

Oct. 27, 1986 [IT] Italy ............................. 54009/86[U]

[51] Int. Cl.⁴ .................................................. B60T 7/06
[52] U.S. Cl. ........................................... 303/20; 303/3; 303/15
[58] Field of Search .................. 303/20, 3, 15, 16, 17, 303/50, 52; 188/156, 158, 161; 338/176, 181, 180; 74/514

[56] References Cited

U.S. PATENT DOCUMENTS

| | | | |
|---|---|---|---|
| 3,390,920 | 7/1968 | Dobrikin | 303/52 |
| 4,043,607 | 8/1977 | Signorelli et al. | 303/100 |
| 4,161,341 | 7/1979 | Reinecke et al. | 303/52 |
| 4,203,632 | 5/1980 | Febreges | 303/100 |
| 4,616,881 | 10/1986 | Muller et al. | 303/52 |
| 4,658,939 | 4/1987 | Kircher et al. | 303/20 |

FOREIGN PATENT DOCUMENTS 3504096 8/1986 Fed. Rep. of Germany ........ 303/20

Primary Examiner—Andres Kashnikow
Assistant Examiner—Mark T. Le
Attorney, Agent, or Firm—Sughrue, Mion, Zinn, Macpeak & Seas

[57] ABSTRACT

The distributor comprises a body in which a movable brake-operating pusher is mounted for movement as a result of the actuation of the brake pedal. The position of the operating pusher relative to the distributor body is detected by means of a linear potentiometer having a casing fitted into the distributor body and a slide provided with a control pusher adapted to cause the displacement of the slide as a result of the movement of the operating pusher.

6 Claims, 1 Drawing Sheet

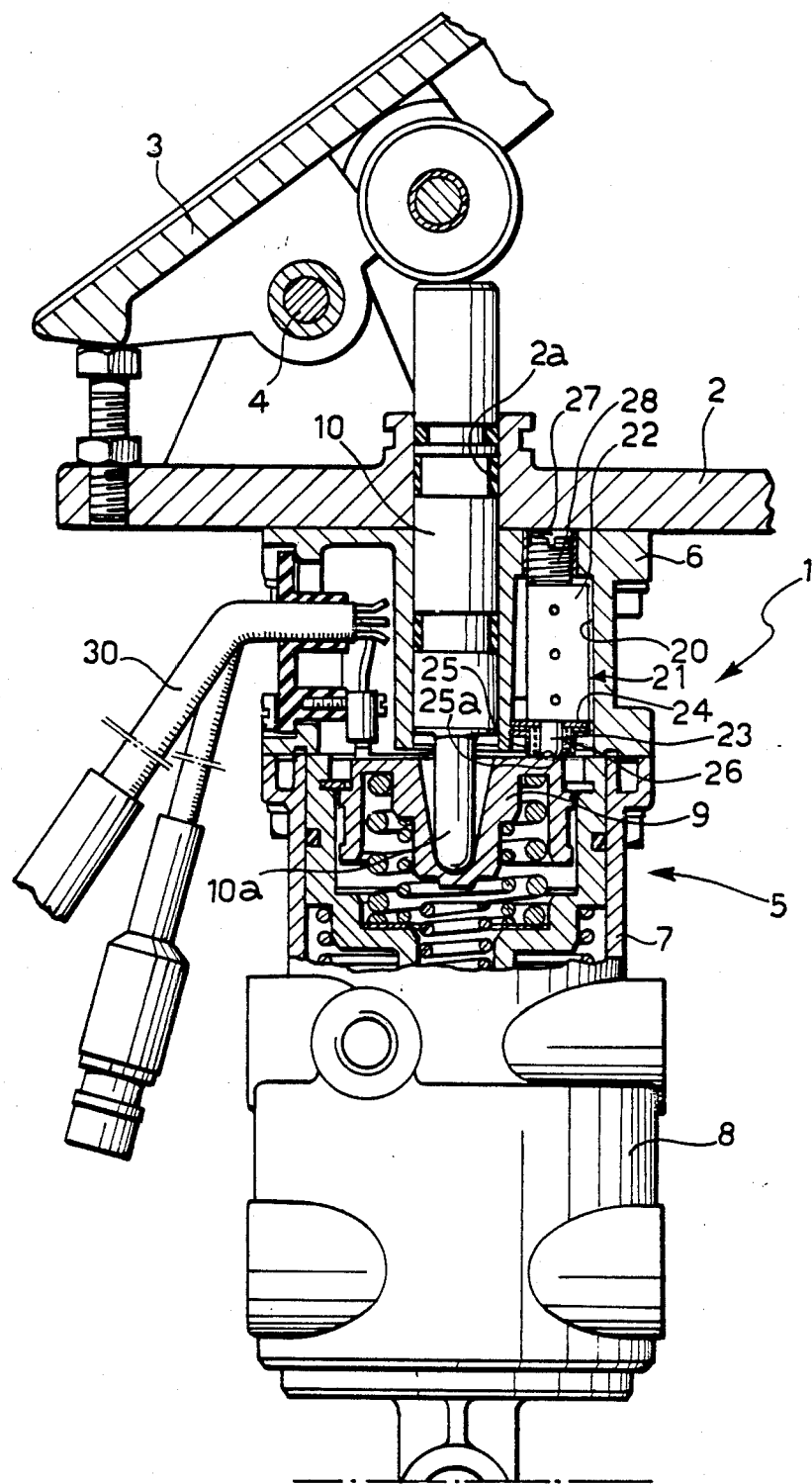

DUPLEX-TYPE DISTRIBUTOR FOR A PNEUMATIC BRAKING SYSTEM FOR A MOTOR VEHICLE EQUIPPED WITH AN AUXILIARY SLOWING DEVICE

BACKGROUND OF THE INVENTION

The present invention relates to a duplex-type distributor for controlling a pneumatic braking system for a motor vehicle fitted with an auxiliary slowing device.

Heavy motor vehicles or vehicles with trailers are generally equipped with and auxiliary braking device, called a slowing device, the purpose of which is to reduce heating an wear of the brake linings, for example during prolonged descents, without however being able to stop the vehicle completely. These slowing devices are generally of the electrodynamic, eddy-current type.

In the most recent systems, the auxiliary slowing device is operated automatically by a control unit as a result of a command given by the driver through the brake pedal. For this purpose it is necessary to detect the position adopted by the brake pedal or a member controlled by it.

SUMMARY OF THE INVENTION

The present invention relates specifically to a duplex-type pneumatic control distributor comprising a body in which a movable brake-operating pusher is mounted for movement as a result of the actuation of the brake pedal, and electrical sensor means for detecting the position of the pusher relative to the body.

The object of the invention is to provide a distributor of the type defined above, which enables the position of the pusher (and hence of the brake pedal) to be detected in a simpler and easier manner to enable the operation of the slowing device to be controlled.

For this purpose, the distributor according to the present invention is characterised in that the electrical sensor means include a linear potentiometer, with a casing fitted in the distributor body, and a control pusher for controlling the movement of the slide, which control pusher is movable through an aperture in the said casing as a result of a movement of the operating pusher so that the position of the slide depends on the position of the operating pusher relative to the distributor body.

A further characteristic is that the distributor according to the invention is provided with mechanical regulating means for enabling the resistance of the potentiometer to be calibrated in correspondence with a reference position of the operating pusher.

Further characteristics and advantages of the invention will become clear from the detailed description which follows, with reference to the appended drawing, provided purely by way of non-limiting example.

BRIEF DESCRIPTION OF THE DRAWINGS

The drawing shows a partly-sectioned, side view of a duplex-type, control distributor.

DETAILED DESCRIPTION OF THE INVENTION

The control distributor 1 is mounted below the floor 2 of the driving cab of a heavy motor vehicle. The distributor is actuated by means of pressure on the brake pedal 3 which is pivotable about a fulcrum 4.

The distributor 1 comprises a body 5 which, in the example illustrated, is formed by end pieces 6 and 8 between which is clamped an intermediate part 7.

An operating pusher 9 of substantially conical shape is housed, in known manner, in the intermediate part 7 of the distributor body and, as a result of its downward displacement, can actuate the distributor.

An actuator rod indicated 10 extends through an aperture 2a in the floor 2 and through the upper portion 6 of the distributor body. The rod 10 has a finger 10a at its lower end which sits in a cavity in the operating pusher 9. The brake pedal 3 rests on the upper end face of the rod 10.

In operation, the depression of the brake pedal 3 causes a corresponding downward movement of the operating pusher 9 which actuates the distributor. The latter is essentially of known type and comprises, for example, two coaxial valves which control the connection of two pressure reservoirs to the brake members of the front and rear axles respectively. A pneumatic distributor of this type is described in detail, for example, in U.S. patent application Ser. No. 33,377 filed on Apr. 2, 1987.

In the upper part 6 of the distributor body is seat 20 which faces part of the operating pusher 9. A linear potentiometer 21 is housed in this seat and comprises a casing 22 which has an aperture at its lower end through which extends a member 23 which drives the movement of the slide. In a manner not shown, the control pusher 23 is biased resiliently downwardly into contact with the upper surface of the operating pusher 9.

The lower end of the casing 22 of the potentiometer 21 rests on a washer 24 which bears on a cup-shaped body 25 which has an aperture 25a in its base through which the control pusher 23 extends. Between the base of the cup-shaped part 25 and the washer 24 is a helical spring 26 which urges the washer (and hence the casing 22 of the potentiometer) towards the upper wall of the seat 20. In this upper wall is a threaded hole 27 into which is screwed a grub screw 28, the lower end of which acts as a stop for the casing 22 of the potentiometer. Depending on the axial position of the screw 28, the axial position of the casing 22 varies relative to that of the control pusher 23 which controls the movement of the slide. It is thus possible, by suitable positioning of the screw 28, to calibrate the resistance of the potentiometer 21 so that a predetermined value of the resistance corresponds to a reference position in the operating pusher 9, for example the rest position shown in the drawing.

The potentiometer 21 is connected to a control unit (not illustrated) by means of a three-core cable 30.

In operation, when the pedal 3 is depressed, the pusher 9, as mentioned earlier, moves downwards by an amount dependent on the position taken up by the said pedal. The member 23 which controls the slide of the potentiometer moves down by a corresponding amount and thus alters the resistance "read" by the unit which controls the operation of the slowing device.

We claim:

1. A control duplex-type pneumatic distributor for controlling a pneumatic braking system for a motor vehicle fitted with an auxiliary slowing device, comprising a body in which a movable brake valve operating pusher is mounted for movement as a result of the actuation of a brake pedal, and electrical sensor means for detecting the position of said operating pusher relative to the body, said electrical sensor means including a linear potentiometer including a casing fitted in said body and a control pusher which is movable through an opening in said casing for controlling the operation of the potentiometer as a result of movement of the control pusher, so that the operation of the potentiometer depends on the position of the operating pusher relative to the distributor body, and mechanical regulating means provided in said body and associated with said casing for enabling the resistance of the potentiometer to be calibrated in correspondence with a reference position of the operating pusher.

2. A distributor in accordance with claim 1, wherein the potentiometer is located in the distributor body above said operating pusher.

3. A distributor in accordance with claim 2, wherein said control pusher of the potentiometer is resiliently biased against the operating pusher.

4. A distributor in accordance with claim 1, wherein the casing of the potentiometer is mounted in the body of the distributor in a position which can be regulated.

5. A distributor in accordance with claim 4, wherein the casing of the potentiometer is located with axial play in a seat in the body of the distributor; resilient means being provided to urge the casing of the potentiometer against an upper wall of the seat; stop means being provided in an axially-adjustable position in said upper wall so as to locate the casing of the potentiometer in a correspondingly-adjustable axial position.

6. A distributor in accordance with claim 5, wherein said stop means comprise a grub screw screwed into a correspondingly-threaded hole in said upper wall of said seat.

* * * * *